May 24, 1955
E. A. RUDOLPH
2,708,899
CAKE DECORATING DEVICE
Filed Oct. 1, 1951
2 Sheets-Sheet 1
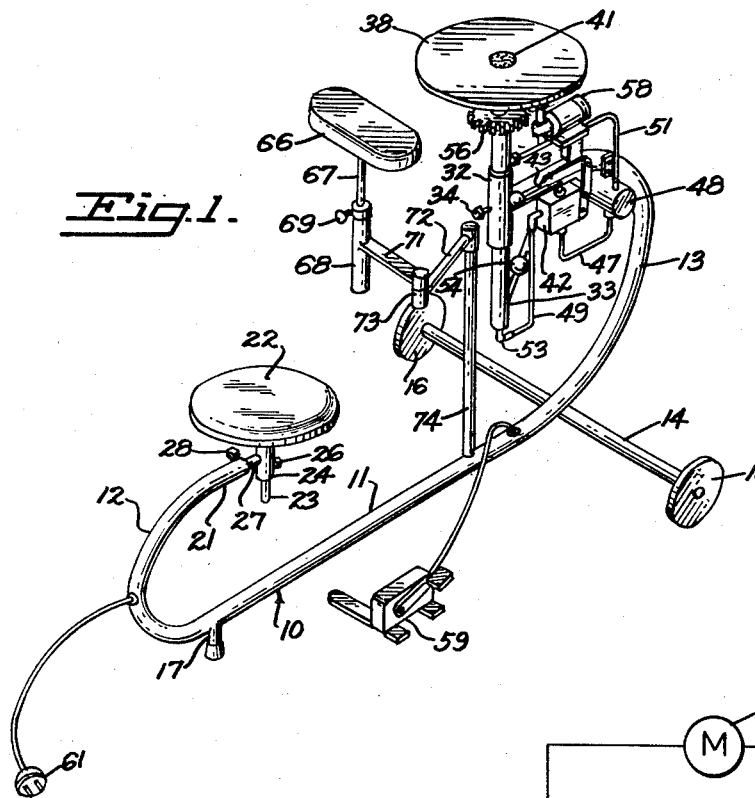
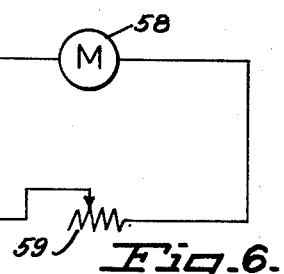
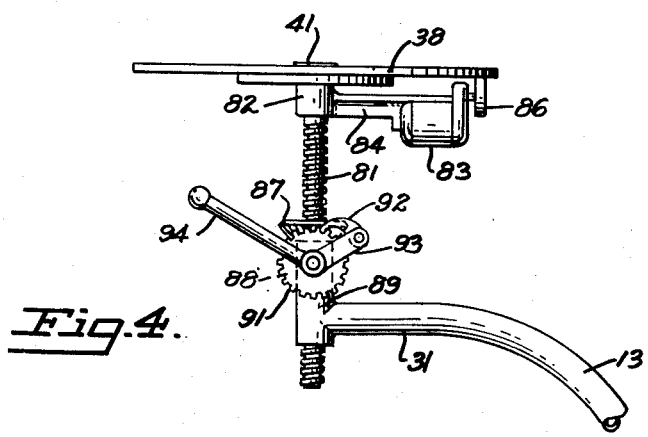
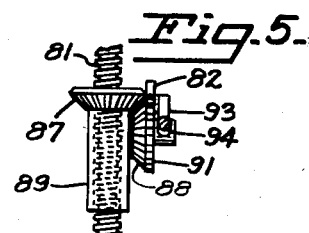
INVENTOR.
EDWARD A. RUDOLPH
BY
Townsend and Townsend
ATTORNEYS

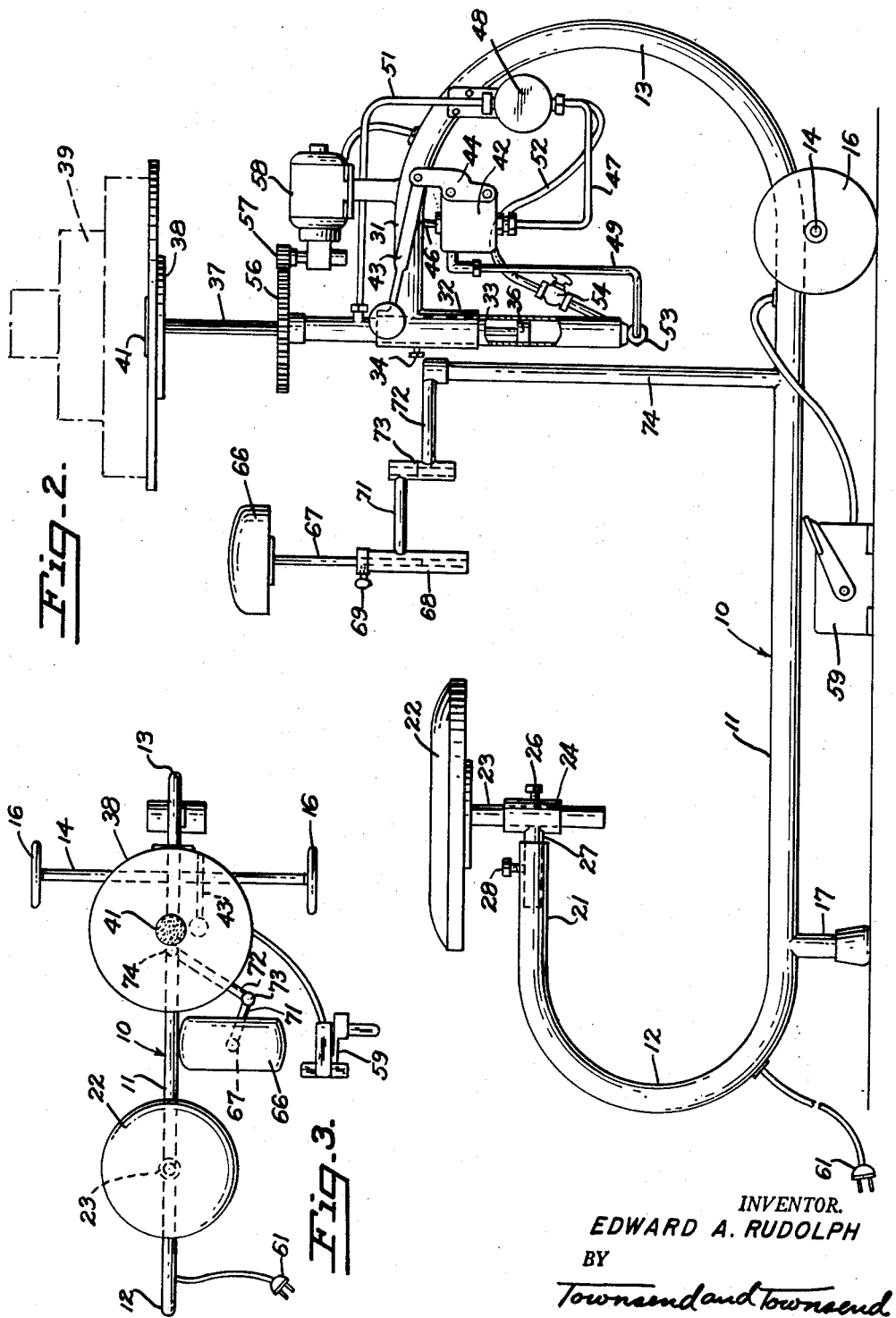

United States Patent Office 2,708,899
Patented May 24, 1955

2,708,899

CAKE DECORATING DEVICE

Edward A. Rudolph, Orinda, Calif., assignor to Duchess, Inc., San Francisco, Calif., a corporation of California Application October 1, 1951, Serial No. 249,090

2 Claims. (Cl. 118—500)

This invention relates to new and useful improvement in cake decorating devices. More particularly, the invention relates to a device having a turntable on which a cake may be positioned, said turntable being rotatable at variable speed under the control of the operator and the elevation of the turntable likewise being manually controlled by the operator.

Further, the invention has for its object the provision of a device arranged for rapid and efficient decorating of cakes and the like. The device is preferably mounted on wheels so that it may be moved to a convenient part of a bakery or the like or installed in a show window as an advertising feature. The elevation of the seat on which the operator sits while decorating pastry as well as the turntable are independently adjustable in elevation. Further, an arm rest is mounted on the device upon which the operator may rest his elbow or forearm so that the pastry tube or other instrument used to apply icing and the like may be accurately and comfortably located in proper position for decorating. Said arm rest is adjustable in elevation and is further mounted on a double swivel so that it may also be adjusted in a horizontal plane in a maximum number of positions.

This invention has particular application in the rapid and efficient application of elaborate and fancy decorations, particularly for multi-layer cakes such as wedding cakes. With its various adjustments and semi-automatic operation, the apparatus affords wide latitude to the operator in making varying designs on the sides and edges, as well as the top, of the cake.

Other objects of the present invention will become apparent upon reading the following specification and referring to the accompanying drawings in which similar characters of reference represent corresponding parts in each of the several views.

In the drawings:

Fig. 1 is a perspective of the device.

Fig. 2 is a side elevation.

Fig. 3 is a top plan.

Fig. 4 is an enlarged detail of a modified turntable elevating and rotating mechanism.

Fig. 5 is a section taken along the line 5—5 of Fig. 4.

Fig. 6 is a wiring diagram of the electric motor and adjustable speed control for rotating the turntable.

The instant invention is a device which may be used by an operator while icing or otherwise decorating cakes, pastry and the like. It will be understood that the operator employs a pastry tube or some other instrumentality for actual application of the decorating material. The instant invention relates to a device for rotating and elevating the object being decorated and the convenience and comfortable accommodation of the operator.

In the embodiment of the invention shown in the accompanying drawings, there is provided a frame 10 preferably made of tubing formed with an elongated horizontal portion 11 provided with an arcuate inwardly turned bend 12 at one end and a similar inwardly turned arcuate portion 13 at the opposite end. A transverse axle 14 is welded to horizontal portion 11 adjacent arcuate portion 13, said axle 14 being provided with wheels 16 at each end. Further, a depending leg 17 is attached to said horizontal portion 11 adjacent the other end, wheels 16 and leg 17 providing a tripod mounting for the device and having the further feature that the entire decorating device may be conveniently transported from one location to another.

The extremity 21 of arcuate portion 12 is arranged to mount seat 22 for the operator. Said seat 22 is attached to the substantially vertical spindle 23 which is received within a vertical collar 24, the elevation of said seat 22 being adjustable by means of set screw 26 in said collar 24. A second spindle 27 is fixed to collar 24 and slidably received in hollow extremity 21 of arcuate frame member 12, spindle 27 and the extremity 21 being normally horizontally disposed. Seat 22 may be adjusted toward and away from the cake decorating turntable by sliding spindle 27 within the open end of tube 21, set screw 28 being employed to maintain seat 22 in the selected position of adjustment.

The extremity 31 of arcuate portion 13 is likewise substantially horizontally disposed and to said extremity is welded vertical collar 32 in which is received vertically disposed hydraulic cylinder 33, cylinder 33 being held in collar 32 by set screw 34. A conventional piston 36 is arranged for reciprocation within cylinder 33 with piston rod 37 extending up through the top of cylinder 33, said rod 37 being fixed to horizontal circular plate table 38 on which the cake 39 to be decorated may be mounted. In the center of said table 38 is a friction device 41 of relatively small diameter which insures that cake 39 will rotate with table 38.

Table 38 may be raised and lowered by manual actuation of hydraulic pump 42, which is manually controlled by handle 43 pivotally mounted on bracket 44 which also mounts said pump 42 on frame 10, said handle 43 being arranged to actuate said pump by means of piston rod 46. Intake line 47 of pump 42 is connected to oil reservoir 48 mounted on frame 10, and discharge line 49 of pump 42 is connected to the bottom of cylinder 33. The opposite end of cylinder 33 is connected by means of return line 51 to oil reservoir 48 so that oil which leaks past piston 36 during elevation of cake 39 is returned to reservoir 48. It will further be apparent that when piston 36 elevates beyond the opening of line 51 into cylinder 33, line 51 acts as a by-pass of hydraulic fluid back to reservoir 48. This arrangement limits the elevation of table 38 beyond a pre-determined height, and also eliminates excessive pressure building up in cylinder 33. In order to lower cake 39 when required, second return line 52 is installed between fitting 53 at the bottom of cylinder 33 and oil reservoir 48, said line 52 having a release valve 54 normally closing said second return line 52 but operable when open to allow escape of hydraulic fluid from cylinder 33 to lower table 38. By pumping pump 42 table 38 may be raised, and by opening valve 54 table 38 may be lowered.

Piston rod 37 is preferably splined and on said rod 37 is mounted splined gear 56 which meshes with pinion 57 which is driven by electric motor 58 mounted on frame 10. In as much as rod 37 may slide relative to gear 56, gear 56 remains at the same elevation but nevertheless causes rotation of table 38 at all elevations of said table. Motor 58 is preferably of variable speed and said speed is adjustable by means of a treadle speed control rheostat 59 which is placed on the floor in a position adjacent the foot of operator. The wiring of motor 58, rheostat 59 and plug 61 which may be attached to any convenient electrical outlet is shown in wiring diagram Fig. 5, the lead wires being received within hollow frame 10.

An elbow rest 66 which is preferably padded for comfort is attached to vertical rod 67 which is received within vertical bushing 68, the elevation of said elbow rest 66 being adjusted by means of thumb screw 69 on said bushing 68. Horizontal arm 71 is connected to bushing 68 and said horizontal arm is connected to second horizontal arm 72 by means of a conventional swivel joint 73. The end of horizontal arm 72 opposite swivel 73 is pivotally connected to vertical tube 74 which extends up from the horizontal portion 11 of frame 10 intermediate seat 22 and cylinder 33. As seen particularly with reference to Fig. 3, the position of elbow rest 66 is adjustable in a horizontal plane throughout a wide range by means of the double swivel connection through which it is mounted on frame 10.

A modified means of elevating and rotating table 38 is shown in Fig. 4. Table 38 is connected to vertical screw 81 through anti-friction bearing 82 rigidly fixed to the upper end of screw 81 which permits rotating of table 38 with respect to screw 81. An electric motor 83 is mounted on the outer end of arm 84 which is fixed to the upper end of screw 81. Said motor 83 drives friction wheel 86 which engages the underside of table 38 so that table 38 turns as motor 83 revolves.

It will be understood that the speed of said motor 83 is adjustable as in the previous modification. Screw 81 is in threaded engagement with bevel gear 87 which meshes with miter bevel gear 88 mounted on bushing 89 attached to frame member 31. Thus as gear 88 turns, gear 87 also turns and by reason of the fact that gear 87 is in threaded engagement with screw 81, screw 81 and table 38 may be raised and lowered. Ratchet gear 91 is fixed for rotation with bevel gear 88 and said ratchet 91 is is turned by pawl 92 which is pivotally connected to the outer end of arm 93 of lever 94 pivotally mounted on said bushing 89. Thus, in a manner similar to the operation of a screw jack, by manual actuation of lever 94, ratchet 91 may be turned.

In operation, the device is moved by means of wheels 16 to the desired location. A cake 39 or other object to be decorated is placed on the center of the table 38, friction device 41 insuring that the cake will rotate with the table. The operator adjusts the elevation of seat 22 for comfortable operating conditions by means of set screws 26 and 28. By means of set screw 69 and swivels 73, he also adjusts the height of arm rest 66 for conveniently supporting his hand in a position to apply the decorating material employed. By means of pump 42 and valve 54 the height of table 38 is adjusted so that the top of the cake may be conveniently decorated and as decorating proceeds, actuation of handle 43 raises the cake so that the lower tiers may be decorated in turn. Meanwhile motor 58 causes rotation of table 38 at desired speed which may be adjusted by foot treadle 59.

The elevation of the modification shown in Fig. 4 is accomplished in the manner of a conventional screw jack.

Although I have described my invention in some detail by way of illustration and example for purposes of clarity of understanding, it is understood that certain changes and modifications may be practiced within the spirit of the invention and scope of the appended claims.

I claim:

1. A device of the character described comprising a frame, said frame comprising a single tubular member bent re-entrantly at both ends, the ends being spaced from one another, the bottom of the rear end of the frame provided with a downwardly depending floor engaging leg, the rear end of the frame carrying an upwardly projecting seat standard and means to connect said seat standard for rotatable movement relative to said frame, a second standard carried by said frame intermediate the front and back ends of said frame, a transverse member provided below the frame adjacent the front end thereof, said transverse member mounting floor engaging wheels at opposite ends thereof and supporting the frame from lateral tilting movement, a work supporting standard secured rotatably to the front end of said frame, the seat standard, intermediate standard and work supporting standard being disposed in a common horizontal plane in respect to one another and said frame and said floor engaging leg.

2. A device of the character described comprising a frame, said frame comprising a single tubular member bent reentrantly at both ends, the ends being spaced from one another, the bottom of the rear end of the frame provided with floor engaging means, the rear end of the frame carrying an upwardly projecting seat standard and means to connect said seat standard for rotatable movement relative to said frame, a second standard carried by said frame intermediate the front and back ends of said frame, a transverse member provided below the frame adjacent the front end thereof, floor engaging means mounted on said transverse member to support the frame from lateral tilting movement, a work supporting standard secured rotatably to the front end of said frame, the seat standard, intermediate standard and work supporting standard being disposed in a common horizontal plane in respect to one another and said frame.

References Cited in the file of this patent

UNITED STATES PATENTS

| | | |
|---|---|---|
| 716,788 | Thomson | Dec. 23, 1902 |
| 1,551,728 | Burger | Sept. 1, 1925 |
| 1,583,389 | Cleveland | May 4, 1926 |
| 1,818,412 | Litty et al. | Aug. 11, 1931 |
| 2,503,673 | Lindquist | Apr. 11, 1950 |
| 2,553,191 | Hettinger | May 15, 1951 |

FOREIGN PATENTS

| | | |
|---|---|---|
| 4,141 | Great Britain | Mar. 19, 1887 |
| 14,691 | Great Britain | 1913 |